H. J. GAISMAN.
METHOD OF AND APPARATUS FOR PRODUCING DESIGNATIONS UPON PHOTOGRAPHIC MATERIAL.
APPLICATION FILED MAR. 23, 1911.
1,272,415.
Patented July 16, 1918.
3 SHEETS—SHEET 1.
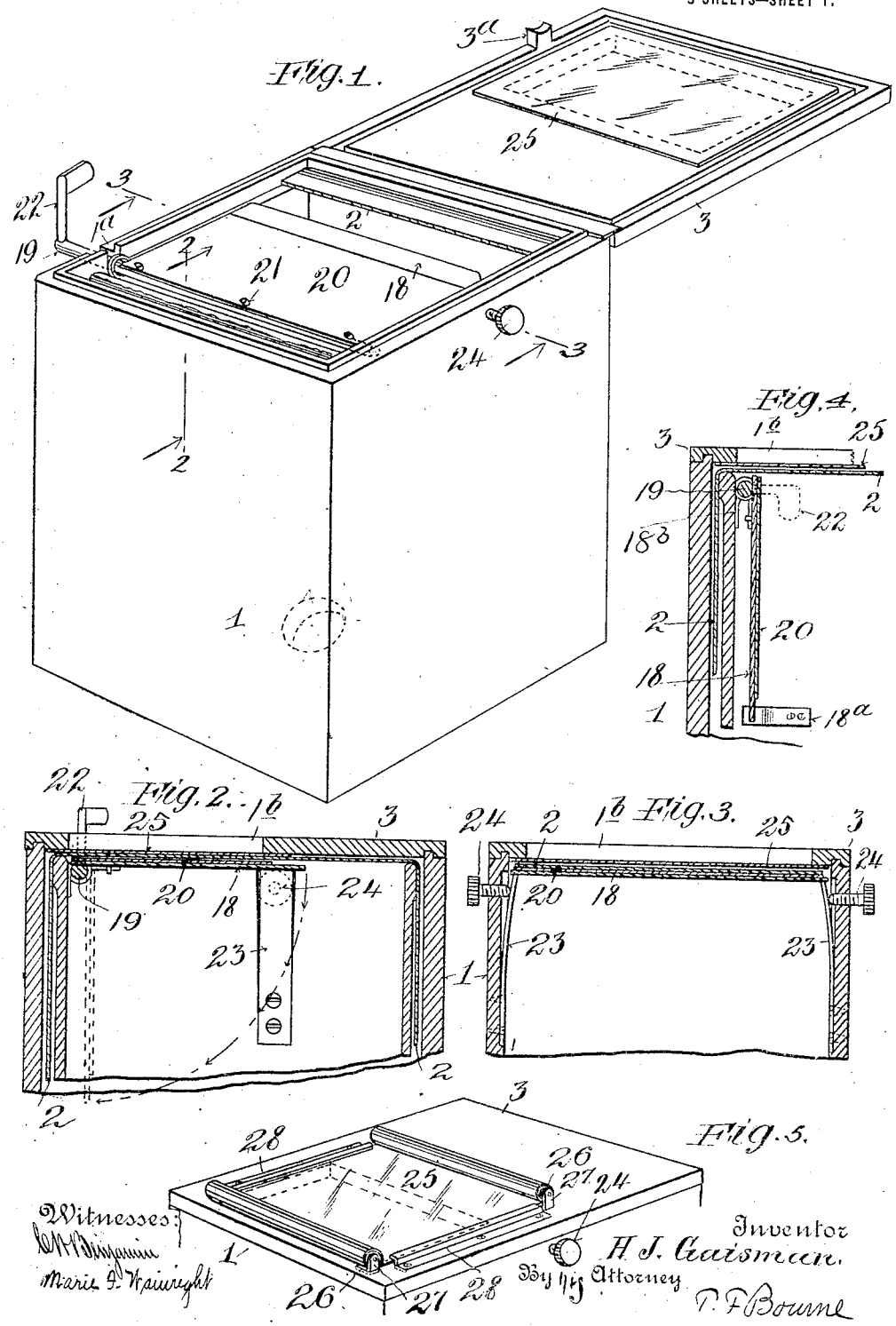
Witnesses:
Inventor
H. J. Gaisman.
By his Attorney
T. F. Bourne

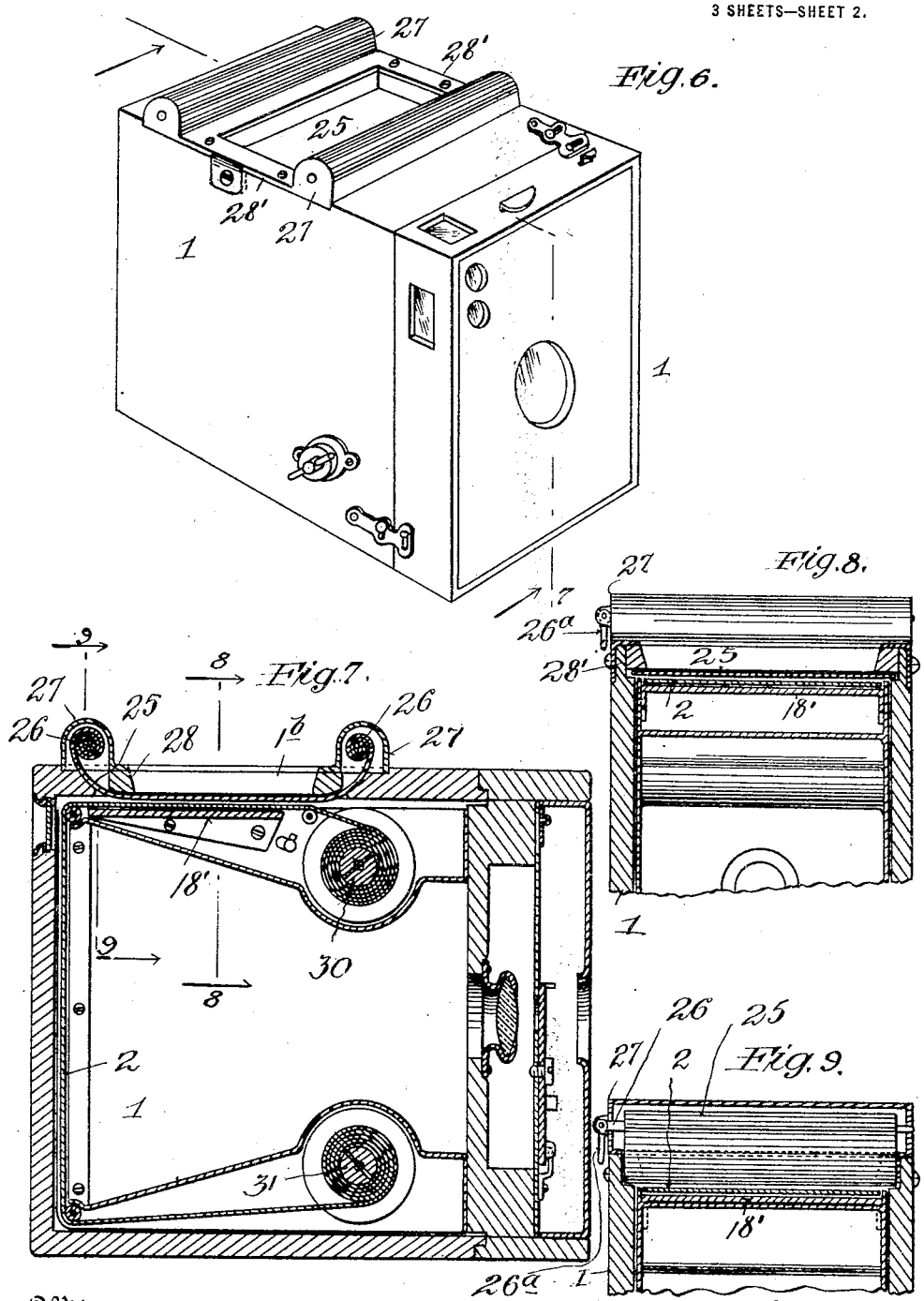

UNITED STATES PATENT OFFICE.

HENRY J. GAISMAN, OF NEW YORK, N. Y., ASSIGNOR TO EASTMAN KODAK COMPANY, OF ROCHESTER, NEW YORK, A CORPORATION OF NEW YORK.

METHOD OF AND APPARATUS FOR PRODUCING DESIGNATIONS UPON PHOTOGRAPHIC MATERIAL.

1,272,415.   Specification of Letters Patent.   Patented July 16, 1918.

Application filed March 23, 1911.   Serial No. 616,428.

*To all whom it may concern:*

Be it known that I, HENRY J. GAISMAN, a citizen of the United States, resident of New York city, borough of Manhattan, in the county of New York and State of New York, have invented certain new and useful Improvements in Methods of and Apparatus for Producing Designations Upon Photographic Material, of which the following is the specification.

My present invention has for its object to provide a method of and means for producing upon a sensitized element, such as photographic film, contained in a holder or camera, designations, markings or indications which may, by subsequent exposure of the film to light and by development, appear in the negative and preferably in proximity to the photograph made by the exposure through the lens. The method consists generally in impressing, as by writing with a stylus or pencil, directly against the film or sensitized surface of the element while it is protected from light, so that said surface will be modified or altered on the lines of the characters traced or marked, and such markings will be subsequently made to appear by exposure to light and development in the usual manner. The alteration of the sensitized surface may be caused either by the application of finely divided material on the lines forming the designations to modify the action of light upon the sensitized material or to alter or modify the sensitized surface itself, in such manner that the characters will appear upon development. This result may be accomplished by writing with a stylus or pencil upon one side of the film or sensitized medium through a locally deformable cover serving to prevent the passage of light to the sensitized surface thereof while the sensitized surface is in contact with what may be termed a transfer medium, said transfer medium serving to affect the sensitized material only on the lines where the local deformation is caused by the pressure exerted by the stylus. The preferred mode, however, is to also locally deform the flexible film support or body and bring the portions of the sensitized surface immediately beneath the stylus into contact with such medium, either to cause the mechanical transfer of particles of finely divided opaque material such as carbon, or the mechanical beating or marring of the sensitized coating on the marked or traced lines. In either event, the subsequent exposure to light of the parts of the sensitized material or element altered by the combined action of the stylus and transfer medium and the development thereof will cause the writing or markings to appear in the negative, either for the purpose of designating the latter, or if desired of appearing in the print made from the negative.

In its broader aspect, the invention contemplates the production of manual or autographic designations in or upon the sensitized material by writing upon a flexible or locally deformable covering material arranged in proximity to the film in order that the effect of such designations shall eventually appear in the developed negative. By the term "flexible or locally deformable" I mean depressible in the lines traced by the stylus, and this term also when used in connection with a sensitized material, as film, means that the sensitized coating and the base on which it is mounted (such as the usual nitrocellulose support) is intended to be locally deformed by the stylus or pencil only on the lines traced by the latter.

It is preferred that the method should be carried out in a holder in which the film or sensitized material is supported for taking photographs in the ordinary way through a lens, and that the means for causing the designations upon the film be located adjacent the field of exposure, so that the designations may be placed in close proximity to the negatives made through the lens. It is, of course, immaterial whether the apparatus for carrying out my invention is strictly speaking a camera, that is whether or not it contains a lens and shutter as part of the permanent structure, as the apparatus employed is primarily a holder for photographic sensitive material such as film, and all the operative parts could as well be embodied in a separate structure adapted to be applied to any of the well known cameras, and therefore the term "camera" is to be understood as meaning a device adapted to hold photographic material so that it may be exposed in the usual way.

While various means for carrying out the method may be employed, I have shown in the drawings the essential parts of an apparatus, but it will be understood that various modifications can readily be made by one skilled in the art.

In the accompanying drawings:

Figure 1 is a perspective view of a photographic apparatus or camera embodying my invention, and illustrating means for producing a desired indication or designation directly upon the film or sensitive element;

Fig. 2 is a sectional view on the line 2—2 of Fig. 1;

Fig. 3 is a section on the line 3—3 of Fig. 1;

Fig. 4 is a sectional detail view substantially similar to Fig. 2, showing the parts 18 and 20 in a different position;

Fig. 5 is a perspective detail view of a slightly modified form of camera or holder;

Fig. 6 is a perspective view of a camera arranged to enable writing upon one side of the film or sensitized element at a point on one side of the exposure surface of the film;

Fig. 7 is a sectional view on the line 7—7 of Fig. 6;

Fig. 8 is a section on the line 8—8 of Fig. 7;

Fig. 9 is a section on the line 9—9 of Fig. 7;

Similar reference numerals in the several figures indicate corresponding parts.

Figure 10:
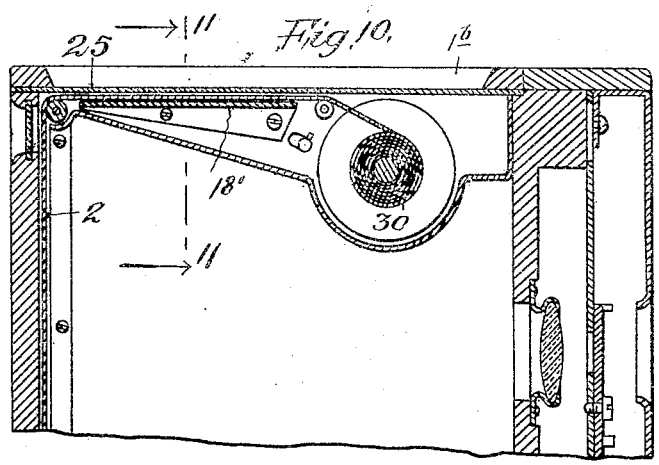
Fig. 10 is a sectional view of a camera showing a modification.

The camera or photographic apparatus indicated by 1 may be of any suitable or well known construction and adapted for use with photographic sensitized elements of any usual or well known character, such as flexible photographic film. By the term "film" I mean a flexible support such as nitrocellulose or celluloid base having upon one of its surfaces a sensitized coating such as gelatino-argentic emulsion. In the form of holder or camera shown in Figs. 1 to 5 I have illustrated the film 2 as adapted to pass across the usual or suitable opening at the rear of the camera or holder closed by the door or lid 3 behind the film, said opening in this instance being opposite the lens of the camera so that the part of the film exposed through the lens is substantially the width of the camera. The portion of film upon which the designation is to be produced extends in proximity to a suitable support or surface preferably arranged in front of the sensitized surface of the film, and the writing or marking is effected by writing or marking against the back of the film with a pencil or stylus whereby the pressure upon the back of the film will locally deform it and cause the portions beneath the stylus to come in contact with the transfer medium only on the lines traced by the stylus.

The character of the transfer medium arranged in front of the sensitized surface of the film determines the character of the markings produced upon the sensitized surface, and I may use a material such as ordinary carbon paper, the particles of carbon being transferred to the sensitized element when pressed against it by the stylus, or the surface of the medium may, if desired, be roughened so that when the sensitized coating of the film is pressed against it, stipples or fine marks will be produced on the lines traced by the stylus. In Figs. 1 to 4 of the drawings, 18 represents a plate or shelf movably supported within the holder or camera as upon a shaft 19 journaled in suitable bearings in the holder walls, said shaft being located near one end of the holder so that the plate may be brought up and extend across a portion of the film which is exposed through the lens in making a regular exposure. Upon the plate 18 is a transfer sheet 20 such as an ordinary carbon sheet, which may be held upon the plate by pins 21 or other supporting means. I have shown the camera provided on one edge with a slot 1ª to permit the ready removal and insertion of the shaft 19 carrying the plate, said shaft being held down in position when the door or lid 3 is closed by a bearing member or projection 3ª formed thereon, as shown in Fig. 1. The shaft 19 is or may be provided with a handle 22 which may be in the nature of a signal on the exterior of the camera or holder, so arranged as to indicate to the operator when the plate 18 is raised into proximity with the face of the film or lowered toward the side of the camera or holder. Suitable means are provided for holding the plate 18 in writing position beneath the film 2, and for this purpose springs or arms 23 are shown secured within the camera adapted to move or be moved beneath the edges of the plate 18 when the latter is swung in front of the film. The buttons or screws 24 passing through the sides of the camera may serve to hold or adjust these springs. When the plate 18 is swung up to operative position adjacent the film, the springs or arms 23 may project or be projected under said plate, as shown in Figs. 2 and 3, and when the plate 18 is to be moved back said springs or arms 23 will be retracted. A retaining latch 18ª secured to the camera wall (Fig. 4) may bear against the plate 18 to retain the latter retracted from in front of the exposure part of the film, or springs 18ᵇ may coact with the shaft 19 for normally turning the plate downwardly to the position shown in Fig. 4 in full lines and Fig. 2 in dotted lines.

Figure 11:
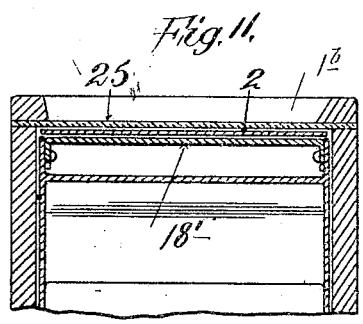
Fig. 11 is a section on the line 11—11 of Fig. 10.

The means for enabling the film to be written upon and at the same time to exclude the light, is accomplished in this particular construction by providing the camera back with a suitable opening 1b opposed to the plate 18 when the latter is in front of the film, this opening in the present instance being formed in the door or movable wall 3 constituting the back of the camera, and extending beneath the opening 1b and over the film is a flexible protector such as a piece of suitable fabric 25 shown in this instance as attached to the edges of the aperture in the cover 3, although if desired one or more walls of the camera or holder might be partly or wholly of flexible material if desired, as shown in Figs. 10 and 11. This flexible protector or covering is locally deformable as by the point of a stylus or pencil, so that the photographer may move the plate 18 adjacent to the part of a film opposite to the lens and then may write upon or against the back of the film through the opaque covering 25 which latter will prevent the passage of light to the film at all times. While, as shown, the flexible covering 25 may be secured to the camera body in a suitable manner, it may also be adjustable so as to bring different parts in position to be written upon or against, as for instance the fabric or cover may be in the nature of a relatively long strip carried by rollers 26 secured upon the cover 3, as by brackets 27 (see Fig. 5), so that the fabric may be moved as desired with respect to the part of the film to be operated upon. Clips or frames 28 may be provided adjacent the edges of the strip 25 between the rollers 26 to aid in holding the strip down and prevent light from passing at the edges.

In using this form of device, the photographer may move the plate 18 and the transfer sheet up in close proximity to the sensitized side of the film 2 whenever it is desired to make a record photographically produced of any desired designation upon the film, and then by writing with a stylus or pencil upon the film through the opening 1b, the rear covering for the film and the film itself will cause to be produced upon the sensitized surface, a corresponding designation, the particles of carbon in this instance being transferred to the surface. Then the plate 18 bearing the transfer medium will be moved aside to the position shown in Fig. 4, and the picture taken in the usual way through the lens, the light passing through the lens also striking a portion of the film containing the carbon particles or otherwise effected by the transfer medium in the characters formed by the writing, and upon development of the film these characters will appear in the negative, or the transfer paper alone may be retracted and the film marked without its aid, as it will be recognized by those skilled in the art that the localized pressure of the film surface against the table 18, particularly when it is roughened as hereinafter suggested, will affect the surface and create designations immediately distinguishable upon the undeveloped or, more particularly, the developed film with or without subsequent exposure to light. If carbon paper is used, the characters will be transparent in the negative, and if the transfer medium is merely roughened, the sensitized coating will be broken, so that the writing will appear. It will be understood, of course, that if desired, exposures can be made in the ordinary way without the use of the plate 18, the latter then being left in the position shown in Fig. 4. The plate 18 and the aperture in the back of the camera or holder through which the writing is effected, it will be noted, extend transversely of the direction of movement of the film when it is fed forward in the camera or holder, so that the designations may appear at one end of the portion exposed.

Figure 12:
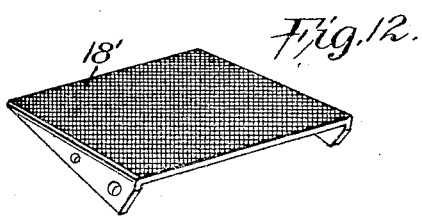
Fig. 12 is a detached perspective view of the support shown in Fig. 11.

Instead of having the plate or shelf 18 movably supported to be interposed between the film and the lens to enable writing or producing the desired designations directly upon the surface of the film while in the exposure position, the camera may be arranged to enable writing upon the film at a point at one side of the line of exposure. This may be accomplished by a camera or holder constructed as shown in Figs. 6 to 9, wherein the plate or rest 18' is supported opposite the opening 1b in the side of the camera or holder in which the film travels between the stylus or reels 30 and 31. In the drawings, the plate or shelf 18' is shown located along the side of the camera having the reel 30 from which the film is unwound, so that the desired designation can be produced upon the sensitized face of the film before the film is adjusted to the exposure position in line with the lens. In this form also the back or opposite side of the film is protected by a flexible protector or fabric 25 which may be detachably or removably retained over the film or may be in continuous form mounted upon rollers 26 carried by frames or brackets 27, and one or both of said rollers may have suitable handles or knobs 26a for operating them, and the flexible material may be retained in position and guided by the clips or frames 28' held upon the camera in any suitable manner, whereby the protecting material may be adjusted along the exterior of the film. In this form of camera, when the film is written upon or against, the same action takes place as before and while the film is protected from light, and while a carbon sheet may be employed in this arrangement, the support 18' may have its surface roughened or serrated as before described, and as shown in Fig. 12, or it might even be smooth if desired, but this does not produce as satisfactory a result. The arrangements shown in Fig. 6 to 11 are such that as the opening 1ᵇ and the plate 18' are not in the line of the field of exposure through the lens, the film after being written upon or against will be adjusted to the exposure position so that the writing produced on the sensitized face of the film may be brought into a position to be exposed to light as within the field of exposure, and light printed or photographed onto the film when the exposure is made.

While I have illustrated and described a particular apparatus for carrying out my invention, it will be understood that any desired means may be provided to protect the film from light while the designations are being produced, and my invention is not limited to the particular form of holder or camera shown. It will be noted that the film and flexible covering therefor are in such proximity to the outer wall of the camera, and the portion upon which the writing may be effected is of such area that it is readily accessible for writing against the film with a stylus or pencil in the ordinary manner, and also that the flexible covering and opening extends transversely of the direction of the feeding movement of the film whereby the designations produced in the negative may be located between the exposures.

Having now described my invention what I claim is:

1. The method of producing designations on film while protected from light within a photographic holder consisting in supporting a film opposite a support in said holder, in writing against said film from the exterior of the holder to press it against said support and thereby alter its inherent characteristics through the application of pressure alone and finally developing said film.

2. The method of producing designations upon a photographically sensitive element while contained in a protecting and exposing holder comprising the steps of forming a mark within the holder in a position to be light printed upon the element; light printing such mark upon said element, and developing the latter.

3. The method of producing a designation upon a photographic film consisting in writing against the film contained in an exposing holder and while protected from light and thereby altering its inherent characteristics by the application of pressure alone, exposing to the light the portion of the film that has been written against and then developing the film.

4. The method of producing a designation upon a photographic film having a sensitive surface, consisting in writing against the film, while opposed by a support and contained in an exposing holder protecting it from light, to affect the sensitive surface of the film corresponding to the writing, then exposing the film to light, and finally developing the said portion of the film.

5. A method for producing designations on a film while protected from light consisting in disposing a film opposite a support in a means for exposing said film to light, in writing against the back of the film to press it against such support for affecting the sensitive surface of the film, in exposing said film to light, and finally developing said film.

6. A method of producing designations upon a photographically sensitive element while contained in a protecting holder consisting in tracing a mark exteriorly of the holder and simultaneously duplicating the same in juxtaposition to said element within the holder and then exposing such mark and element to light.

7. The method of producing designations upon a photographically sensitive element while contained in a holder protecting it from light and including a locally deformable opaque covering for said element, said method consisting in forming markings upon said element through said opaque covering and then exposing said element thus marked to light.

8. In combination with a holder for photographically sensitized material, means whereby characters may be manually inscribed upon a portion of the material while protected in said holder from the action of light and means for admitting light to such portion of the material so marked to photographically record the characters thereon.

9. A camera having means to support a film in the line of exposure and an opening to permit marking against the film while it is within the camera, and means to prevent light through said opening from striking the film while the marking is being effected on the film.

10. A camera having means to support a film, a support opposite the sensitive surface of the film between the supports for the films and a deformable opaque covering for the portion of the film opposite said support, the deformable covering being exposed to permit the production of designations on the film.

11. A camera having means to support a sensitized element in position for exposure, and an opaque locally deformable covering for the element accessible from the exterior to permit marking against the element while it is in such position.

12. A camera having means to support a film in position for exposure, and an opening to permit marking against the film while it is within the camera and protected from light, and means to cause such marking to be affixed to the film while it is in such position.

13. The combination with a camera provided with an opening at the rear of a portion of its contained film, of a plate within the camera on the side of the film opposite to said opening and to the corresponding surface of the film to enable the production of designations upon the film, and means to prevent light striking the film through said opening.

14. A camera provided with an opening at the rear of the contained film, a flexible covering for the rear of the film and means to cause designations written against the covering to appear upon the film.

15. A camera having means to support a contained film, a flexible opaque covering portion accessible from the exterior, and a support, said support and covering being arranged on opposite sides of the film to enable the film to be marked upon through such portion to produce designations thereon.

16. A camera having means to support a film in the line of exposure, a flexible opaque covering portion in rear of the film accessible for writing from the exterior of the camera and a support in front of a portion of the film and beneath the covering.

17. In a holder for sensitized photographic material, the combination with a casing containing film holding devices and having an aperture in rear of the film, of a support movable into and out of operative position in front of the film and opposite to said aperture and a locally deformable covering for the rear side of the film opposite the support.

18. A camera having an opening back of the contained film, a flexible protector for said opening adjacent to the back of the film, a member movably supported within the camera at the other side of the film to support the film for writing thereagainst, and means to hold said member adjacent the sensitive surface of the film and in operative relation to said opening and protector.

19. A camera provided with an opening back of a portion of its contained film, a support opposed to the opening and to the sensitive face of the film, and a protecting flexible strip for said opening.

20. A camera provided with a plate movably supported near one margin of the exposure surface of the contained film and adapted to be placed opposite a portion of such surface, said camera having an opening in the rear of said portion of the film.

21. A camera provided with a plate movably supported near one margin of the exposure surface of the contained film and adapted to be placed in register with a portion of such surface, said camera having an opening back of such portion of the film, and a spring to normally hold the plate out of register with said portion of the film.

22. A camera provided with a plate movably supported near one margin of the exposure surface of the contained film and adapted to be placed in register with a portion of the front surface of the film, said camera having an opening in rear of such portion of the film, and means to hold the plate in position opposed to the opening after it has been so placed.

23. A camera provided with a plate movably supported near one margin of the exposure surface of the contained film and adapted to be placed in register with a portion of the front surface of the film, said camera having an opening in rear of such portion of the film, a spring to hold the plate retracted from said portion of the film, and means to retain the plate in front of the exposure portion of the film after it has been so placed.

24. A holder for sensitized material having means for supporting a sensitive film therein and having a transfer medium so arranged with reference to the film that the two may be jointly written upon while the film is protected from light.

25. In a camera, the combination with means for positioning a film therein, a support arranged at one side of the film and an associated transfer medium disposed to receive jointly with the film writing pressure from the exterior of the camera exerted against the support, the camera being provided with an opening through which such pressure may be exerted.

26. In a camera, the combination with the casing thereof including a deformable light obstructing portion, the latter accessible to receive writing pressure from the exterior of the camera, of means within the casing for operatively positioning a sensitive film opposite such deformable portion, a support registering with such portion on the opposite side of the film, and an associated transfer medium disposed between the support and film.

27. A camera having an opening back of the contained film, a flexible film protector for said opening, a transfer medium within the camera, and means for removably retaining said transfer medium opposite said opening and in operative relation to said film to permit writing thereagainst.

28. A camera having a transfer medium to coact with the sensitive surface of the contained film, and a flexible film protector opposed to the transfer medium and accessible from the exterior of the camera to permit writing against the film.

29. The combination with a holder for sensitized material, of a transfer medium on one side of the sensitized material and a locally deformable opaque covering on the opposite side accessible from the exterior of the holder and enabling the material to be written against to cause an impression from the transfer medium to be made on the sensitized material.

30. A camera provided with an opening back of its film, and means to removably sustain a transfer sheet opposite the opening and in front of the film to enable the latter to be written upon.

31. A camera provided with an opening back of the contained film, a movable member within the camera adapted to be moved opposite to the opening or away therefrom so as to be made to support the film for writing thereagainst, and a transfer medium between the film and said member.

32. A camera having a member movable into a position in front of its contained film, and a transfer sheet between the film and said member when thus positioned, said camera having means for excluding light and enabling writing against the film opposite the transfer sheet.

33. A holder for a photographic sensitized element having therein a transfer sheet and a support therefor movable into and out of proximity to said element, and means for transferring written impressions from said sheet to the element from outside the holder without admitting actinic light to the holder.

34. The combination of a camera provided with an opening back of a portion of its contained film, with a plate within the camera movable into a position in front of such portion of the film, and means to detachably fasten a transfer sheet to the plate, and flexible means to prevent light striking the film through said opening.

35. A camera having an opening back of its contained film, a member pivotally supported within the camera near one margin of the exposure portion of the film and adapted to be moved in front of said portion of the film to support the film for writing thereagainst, a transfer medium carried by said member to be placed thereby in front of the exposure portion of the film, a stop within the camera to hold the movable member in front of the film, and means to operate said stop.

36. A camera provided with an opening back of the contained film, and a movable member within the camera adapted to be moved in front of the film to support the film for writing thereagainst through the opening, a transfer medium between the film and said member, and means for maintaining said member in firm position in front of the film.

37. A camera having an opening back of the contained film, a member pivotally supported within the camera near one margin of the exposure portion of the film to support the film for writing thereagainst through the opening, means to maintain said member in front of said portion of the film, and a transfer medium between said member and the film.

38. A camera having an opening back of its contained film, a member pivotally supported within the camera near one margin of the exposure portion of the film and adapted to be moved in front of said portion of the film to support the film for writing thereagainst through the opening, a transfer medium carried by said member to be placed in front of the exposure portion of the film, and means to removably support said medium and member in front of the film.

39. A camera provided with an opening back of the contained film, a plate adapted to be moved into and out of register with the exposure portion of the film and with the said opening, a shaft within the camera supporting the plate for such movement, means to sustain a transfer medium upon the plate and means to sustain the plate in register with the exposure portion of the film and with the opening.

40. A camera provided with an opening back of the contained film, a plate adapted to be moved into and out of register with the exposure portion of the film and with the said opening, a shaft within the camera supporting the plate for such movement, means whereby said shaft and plate are removably retained within the camera, means to sustain a transfer medium upon the plate and means to sustain the plate in register with the exposure portion of the film and with the opening to support the film for writing thereagainst.

41. A camera provided with an opening back of the contained film, a plate adapted to be moved into and out of register with the exposure portion of the film and with the said opening, a shaft within the camera supporting the plate for such movement, said shaft having an exteriorly arranged indicator to indicate the position of said plate, means to sustain a transfer medium upon the plate and means to sustain the plate in register with the exposure portion of the film and with the opening.

42. A camera having a perforated wall and a film abrader opposed to and spaced apart from such perforation; said space affording room for locating a light-protected photographic film between the inward surface of the wall and the film abrader whereby the film may be pressed against the abrader by means of a stylus.

43. The method of producing designations upon a photographically sensitive element while contained in a holder and protected from light in part thereby and in part by a locally deformable opaque covering adjacent one side of said element, there being a member having transfer material adjacent the opposite side of said element, said method consisting in forming markings upon said element by pressure applied through said covering to locally transfer such material onto said element.

44. The method of producing designations upon a photographically sensitive element while contained in a holder and protected from light in part thereby and in part by a locally deformable opaque covering adjacent one side of said element, there being a member having transfer material adjacent the opposite side of said element, said method consisting in forming markings upon said element by pressure applied through said covering to locally transfer such material onto said element, and then exposing the marked portions of said element to light.

45. The method of producing designations upon a photographically sensitive element while contained in a holder and protected from light in part thereby and in part by a locally deformable opaque covering adjacent one side of said element, there being a member having actinically opaque transfer material adjacent the opposite side of said element, said method consisting in forming markings upon said element by pressure applied through said covering to locally transfer such material onto said element.

Signed at New York city, in the county of New York and State of New York, this 22nd day of March, A. D. 1911.

HENRY J. GAISMAN.

Witnesses:
J. OESTLER,
F. A. MILLER.